Oct. 19, 1943.  J. O. JACKSON  2,332,227
INSULATED CONTAINER WITH HEATED BOTTOM
Filed Jan. 31, 1942  3 Sheets-Sheet 2
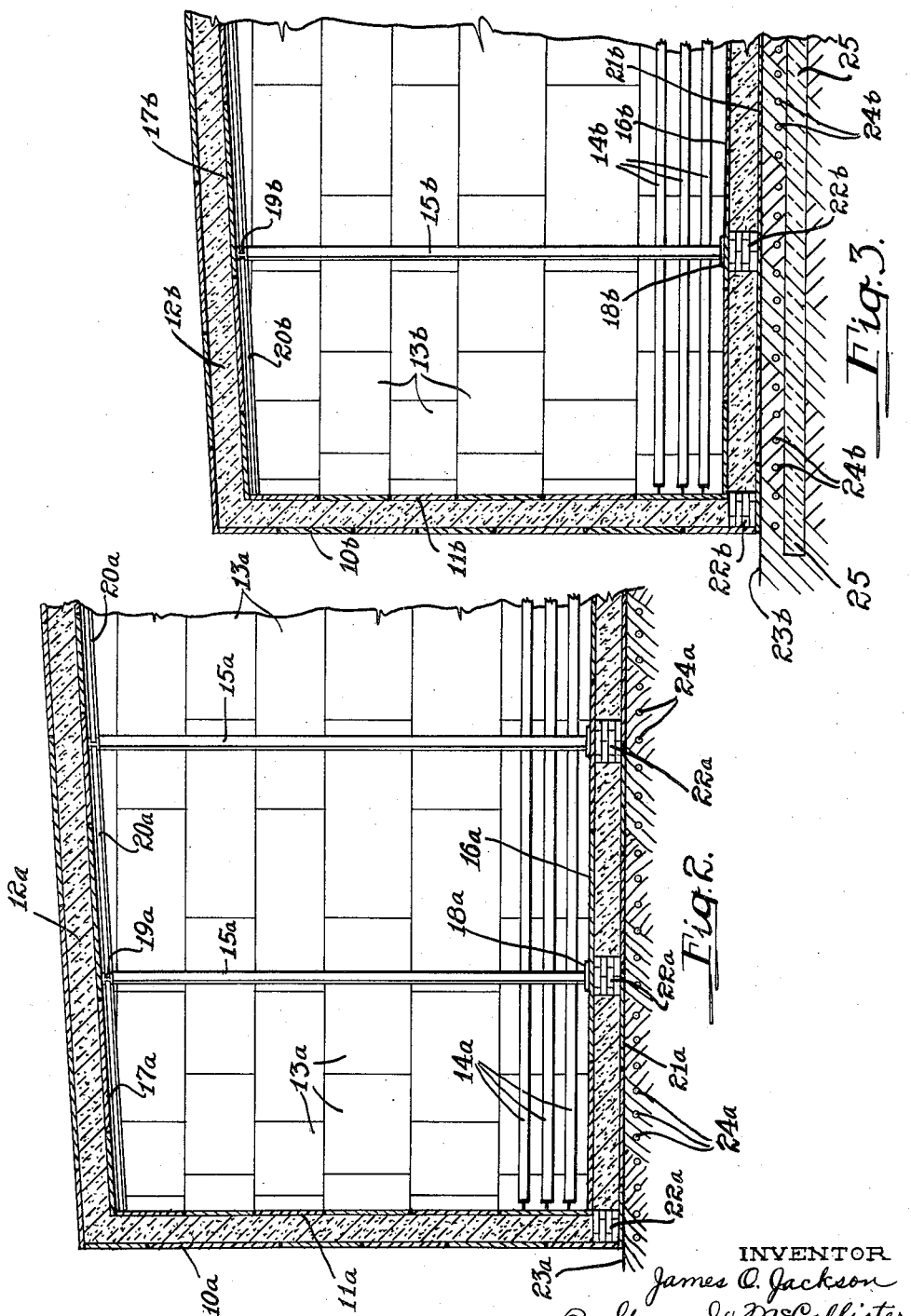
INVENTOR
James O. Jackson
By Green & McCallister
His Attorneys Patented Oct. 19, 1943

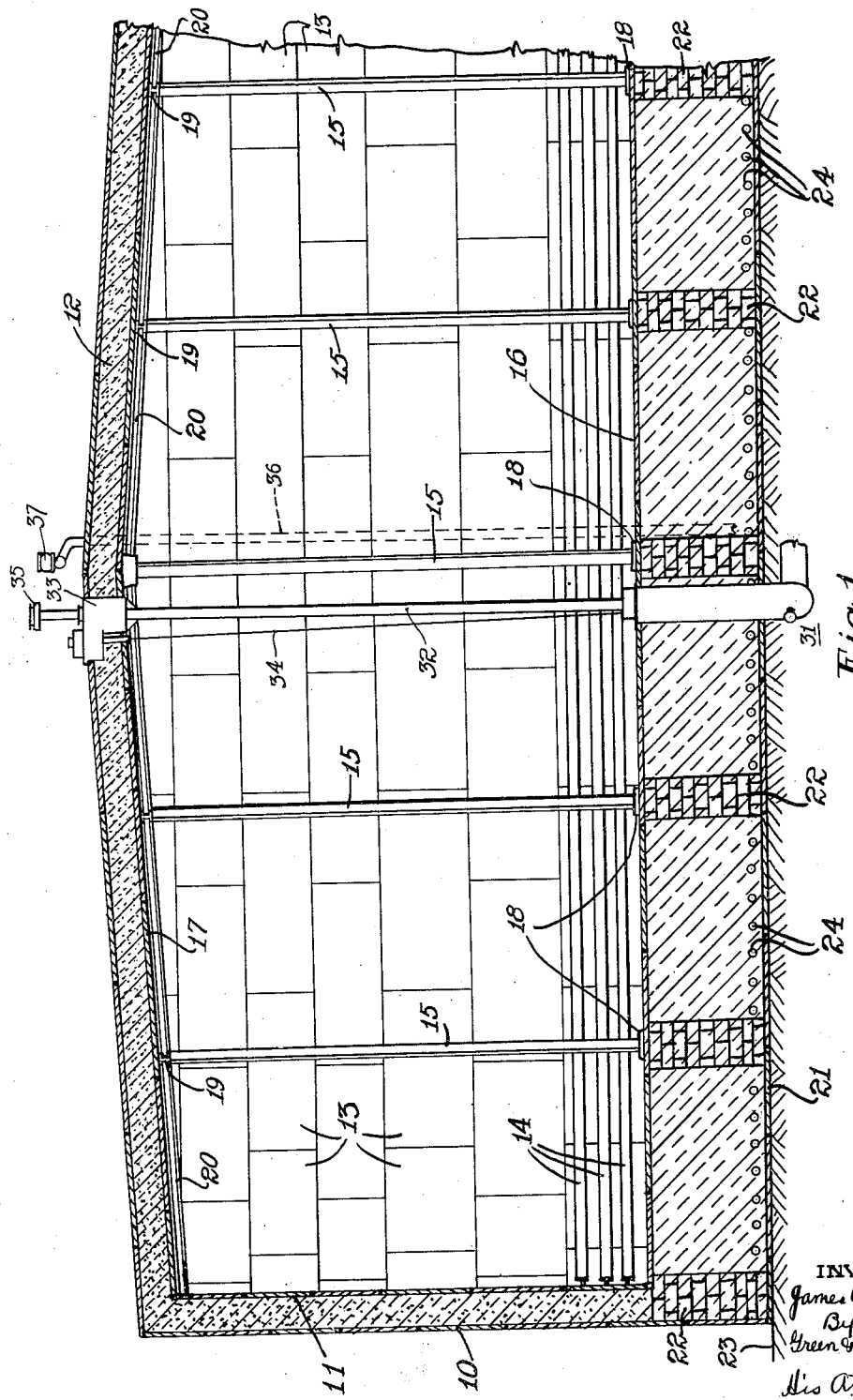

2,332,227

UNITED STATES PATENT OFFICE 2,332,227

INSULATED CONTAINER WITH HEATED BOTTOM

James O. Jackson, Crafton, Pa., assignor to Pittsburgh-Des Moines Company, a corporation of Pennsylvania Application January 31, 1942, Serial No. 429,049

8 Claims. (Cl. 62—1)

The present invention relates to insulated containers for storing liquefied gases and other liquids at temperatures below 32° F., and more particularly relates to such insulated tanks when provided with means for heating or warming the bottom portion of such container and the earth therebeneath.

In my copending application Serial No. 426,192, filed January 9, 1942, I have explained that the storage of liquefied gases and other liquids at temperatures below the freezing point of water causes freezing and consequent heaving of the earth under and adjacent such containers and that in order to prevent undesirable stresses on the bottom of the container it was necessary to elevate the container above the surface of the earth. This, however, while entirely satisfactory, involves additional labor and materials as compared with a container designed to rest on the ground. In some cases, and for purposes of economy and convenience, it is desired to have the container rest upon the ground or even to be partially sunk into the ground but, so far as I am aware, no satisfactory arrangement has heretofore been devised for making this practicable in connection with large insulated containers adapted for the storage of liquids at temperatures below the freezing point of water.

It is, therefore, one of the objects of the present invention to provide an insulated container for storing liquefied gases and other liquids at temperatures below 32° F. which rests directly upon the surface of the earth and yet which is not subject to the difficulties resulting from freezing of the earth.

Another object of the invention resides in providing a large container for storing liquids at temperatures below 32° F. and wherein provision is made for equalizing the temperature of the earth under and adjacent the container as compared with the temperature of the earth at nearby points.

A further object of the invention resides in the provision of a simple and relatively inexpensive insulated container for storing liquids at temperatures below 32° F. which is characterized by the fact that it requires no columns or the like and no supporting pedestals.

A still further object of the invention resides in means for applying heat to the bottom or bottom portion of an insulated container for liquids existing at a temperature below 32° F.

Other and further objects and advantages will be pointed out hereinafter or will be understood by those skilled in this art.

In the accompanying drawings:

Fig. 1 illustrates, partly in section and partly in elevation, an insulated container with a heated bottom responding to my present invention;

Fig. 2 is a fragmentary view similar to the left-hand portion of Fig. 1 but of a modified form of the invention;

Fig. 3 is a view similar to Fig. 2 of a still further modified form of the invention;

Figure 4:
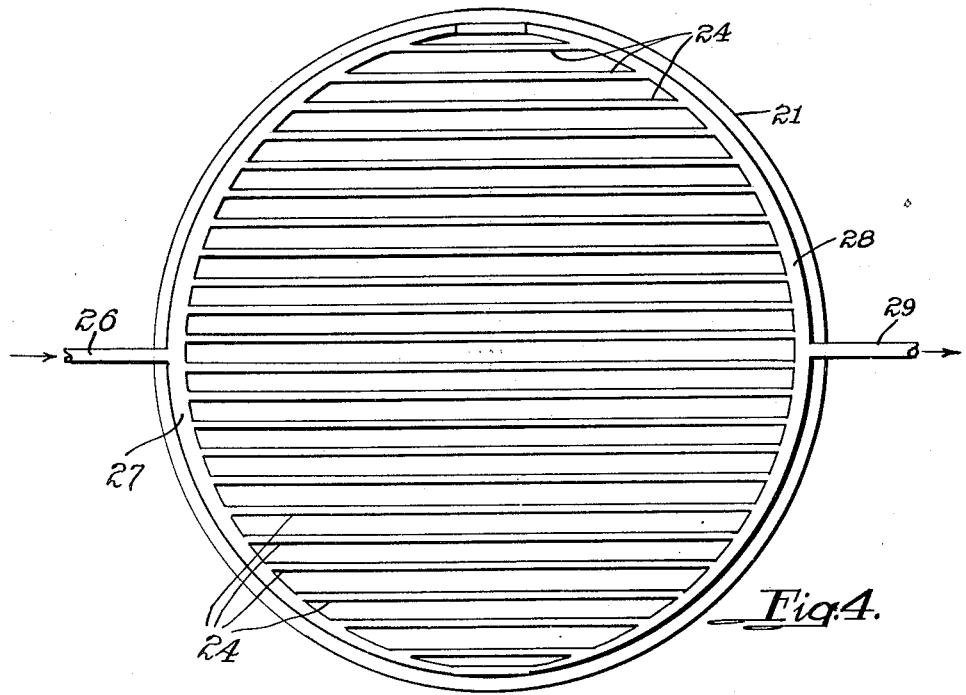
Figure 5:
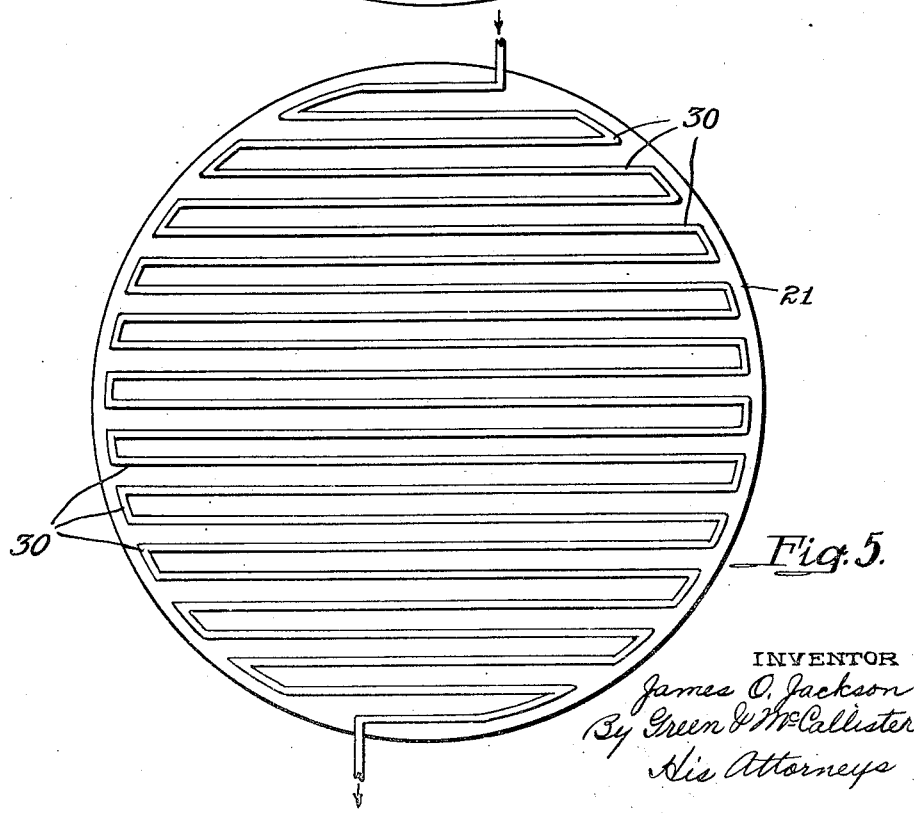

Fig. 4 diagrammatically illustrates a typical heating system for use in connection with my new container; and Fig. 5 similarly illustrates a modified heating means.

Like numerals designate corresponding parts throughout the several views of the drawings.

My present container is particularly designed to rest directly upon the earth's surface without causing freezing and consequent heaving of the earth and thus avoiding the disadvantages outlined in my aforesaid copending application. Those disadvantages have necessitated the elevation of the container above the surface of the earth so that the atmosphere could circulate freely around the entire container and in some instances temperature equalization was secured or improved upon by circulating heated gases or fluids between the tank and the earth. In some instances, it is neither desirable nor convenient to employ an elevated tank. There are also instances in which the cost of the container must be maintained at a minimum in order to justify use thereof. By the term "elevated tank" I mean any large tank or container which is above the earth's surface, out of contact therewith and not supported directly thereby, even though the distance between the bottom of the tank and the earth's surface may be relatively small in any particular installation.

In accordance with my present invention, insulated containers of large size and resting directly upon the surface of the earth can be designed and erected at relatively low cost and yet without entailing any of the disadvantages ordinarily resulting from placing a container on the earth's surface, the contents of which are at a temperature below 32° F. and which may frequently be at temperatures as low as —260° F. One successful container responding to my present invention is illustrated in Fig. 1 and it will be noted that, in general, the container bears a marked similarity to the container of my aforesaid copending application, reference to which is made for a fuller description. In Fig. 1, however, the container illustrated comprises an outer metal shell 10 and an inner metal shell 11 smaller than and spaced from said other shell so as to provide therebetween a space which, as shown, is filled with a suitable heat insulating material 12 which acts as a barrier to the infiltration of heat from the outside atmosphere to the contents of the inner shell and also blocks black body radiation. Such material may be granulated cork or other suitable material.

The inner shell 11 is composed of a plurality of metal plates 13 of suitable composition butt-welded together in fluid-tight relationship to form a container of any desired configuration. The shape of such container may be cylindrical with a flat bottom and a shallow conical roof, as illustrated in Fig. 1, or it may be of any other suitable shape, such as spherical or ellipsoidal. The inner shell 11 is preferably composed of a metal or alloy which, at the temperature involved in the storage of any particular liquefied gas or other material, has the requisite ductility and other physical properties. In my opinion, any metal or alloy which, at a given temperature, has a Charpy impact value of at least 10 ft. lbs. is satisfactory. Among such metals and alloys are aluminum, copper and the austenitic steels such as the 18-8 type chromium-nickel steels and, while these are satisfactory, they are somewhat expensive and I, therefore prefer to employ steel containing approximately 3½% of nickel within which term I include those steels containing from about 3-4% of nickel. The addition of nickel to steel in any amount is advantageous as it lowers the temperature at which the Charpy impact test value becomes 10 ft. lbs., and it is to be understood that nickel steels may be employed for the inner shell 11 containing up to about 10% of nickel. The lower limit is that amount which, at a given temperature, enables a Charpy impact test value of at least 10 ft. lbs. to be obtained. A 3½% nickel steel has a Charpy impact value of about 18-20 ft. lbs. at —260° F.

The outer shell 10 is composed of ordinary or mild carbon steel plates welded together in fluid-tight manner to produce the configuration desired and which is preferably shaped similarly to the inner shell but of somewhat larger size. The inner shell is also provided with a suitable number of circular stiffeners 14 welded in spaced vertical relationship to the inner shell. Columns 15 are provided which extend substantially from the bottom 16 to the roof 17 of such shell for support purposes. Bottom 16 is made up of lap-welded plates. The columns 15 have their lower ends resting upon base plates 18 which are suitably secured as by welding to the bottom of the inner shell and a suitable roof framing is provided between the tops of the said columns and the roof 17 of the said shell made up of circular horizontal girders 19 and radial rafters 20, the nature and construction of which will be fully appreciated from my aforesaid copending application, the pertinent portions of which are hereby made a part hereof.

It will be particularly noted that the bottom 16 of the inner shell is considerably spaced above the bottom 21 of the outer shell, which is likewise composed of lap-welded plates, and that the space therebetween is filled with insulating material, part of which is in the form of molded blocks 22 or the like beneath the columns 15 and between the corners of the shells and the remainder of which is of any thermally efficient material such as that at 12 between the container walls and roofs. The block type insulating material 22 serves to support the concentrated loads beneath the columns, whereas the granular type of insulation is only capable of supporting the more uniformly distributed weight of the fluid.

It will further be noted that the bottom 21 of the outer shell 10 rests directly upon the surface of the earth as designated by the ground line 23. It is, of course, understood that the ground may be suitably prepared by leveling, grading or the like in order to avoid distortion of and the imposition of undesired stresses upon the tank bottom. Embedded in the insulation between the shell bottoms and relatively close to the bottom of the outer shell I provide heating means which is indicated by the pipes 24. Any suitable heating medium may be passed through such pipes such as steam, hot water or any heated fluid. The purpose of the heating is to equalize the temperature of the ground below the tank with relation to the temperature of the ground around the tank or at nearby points so as to avoid the heaving action which results from the temperature differential and the freezing of the earth, it being borne in mind that the contents of the container may be liquefied natural gas, liquefied methane, etc. at temperatures often as low as —260° F. The heating effect desired is substantially that which brings about the temperature equalization above referred to and heating beyond this amount is unnecessary and uneconomical. The heating means is so located with respect to the bottom of the outer shell and the ground that efficient heating downward through the bottom of the outer shell and into the ground will be secured. At the same time, the heating means is so located relative to the bottom of the inner shell and its contents that no appreciable heating of such contents will occur. The location of the heating means shown in Fig. 1 is satisfactory for these purposes.

In the case of already completed containers or where it is desired to produce a uniform type of container, the heating means 24a may be located in the ground rather than between the shell bottoms, as shown in Fig. 2. This modified arrangement has the advantage that it can be applied to existing containers and involves no modification in the structure of the container itself. Such a container may be, therefore, like that of my aforesaid copending application but arranged to rest directly upon the ground. The various parts of the container of Fig. 2 are, in general, the same as those of Fig. 1, as is indicated by the choice of numerals. In the form of invention illustrated in Fig. 2, however, the heating means such as the pipes 24a are embedded in the earth below the ground line 23a. This may, for example, be carried out by digging a shallow pit where the tank is to be located, placing the heating means therein and then filling the pit with earth and suitably compacting the same, after which the container is disposed upon the earth above the heating means. This form of the invention is quite simple and inexpensive and is well adapted to use with already fabricated containers, which is a big advantage. The thermal efficiency of the heating means in Fig. 2 is satisfactory but there is some waste of heat due to the fact that a proportion of the heat energy passes directly downwardly into the earth beyond a depth having any bearing on the present invention and raises the temperature of that earth, which has no effect upon the heat equalization desired. I have found in this connection that it is not necessary to heat the earth for any great distance in a vertically downwardly direction below the container but that it is only necessary to heat a relatively shallow layer of earth.

To increase the effective utilization of the heat energy produced by the arrangement of Fig. 2 and to cut down the losses represented by the heating of unnecessarily deep layers of earth which have no effect upon the desired heat equalization, I provide, as shown in Fig. 3, a layer of insulating material 25 disposed below the heating device indicated by pipes 24b. The presence of this layer of insulation not only blocks and limits the downward travel of heat energy from pipes 24b but cuts down the amount of heat necessary to produce the heat equalization effect above referred to. The further modified arrangement of Fig. 3 is, therefore, advantageous and more economical. In carrying out this form of the invention, it will be appreciated that a deeper pit is dug than in the case of the construction of Fig. 2, that the pit is provided with the layer of insulating material of any suitable nature but preferably blocks, sheets or strips of molded cork, that some earth is then replaced upon the insulating layer, the heating means 24b installed and the pit then filled with earth and suitably compacted and leveled for the reception of the container which rests directly thereon as shown.

In Fig. 4 I have diagrammatically illustrated a typical or preferred heating means or arrangement with the understanding that my invention is not limited to any particular heating device or to any specific arrangement of heating pipes. In Fig. 4 the fluid heating medium is introduced via pipe 26 into the arcuate header 27 which, as shown, becomes progressively smaller toward its ends. In connection with a circular container, an opposed similarly constructed header 28 is provided which is connected to and communicates with header 27 by a plurality of branch pipes 24 which are preferably but not necessarily disposed in parallel relationship. An outlet pipe 29 is provided for the header 28 and the exhaust therefrom may be utilized for its residual heat content or not depending upon circumstances. In Fig. 5, the heating medium enters one end of a fretwork or the like of pipes 30 and exhausts at the other end, the pipe or pipes being shaped to provide an even heating effect.

I have diagrammatically illustrated in Fig. 1 an operating mechanism which forms an integral part of the container, it being understood that a like mechanism will constitute a part of the modified forms of container. The particular details of the operating mechanism are not per se a part of the present invention nor do they constitute a restriction thereon and hence reference is made to my copending application above-identified for the details of construction thereof, the pertinent portions of which are hereby made a part hereof. In general, however, this operating mechanism includes an insulated boot 31 which is diagrammatically and fragmentarily illustrated and the vertical cylindrical portion of which is somewhat elongated because of the abnormal distance between the inner and outer shell bottoms. The operating mechanism also includes a vapor pipe 32 and a member 33 which encloses safety devices such as rupture valves and the manual means for opening and closing the liquid inlet and outlet pipe (not visible) located in the boot 31 and which is opened or closed for liquid introduction or withdrawal by means of a cable or the like 34 operable from without the container. As will further be understood, a secondary safety device such as an oil seal 35 is provided as well as a back pressure pipe 36 which follows closely the outline of the container and terminates at its upper end in a relief valve 37.

It is to be understood that the foregoing is intended as illustrative and not as restrictive and that other and further additions, omissions, substitutions and modifications may be made without departing from the spirit and principles hereof. Rather, the invention is that defined by the appended claims.

Having thus described my invention, what I claim as new and desire to secure by Letters Patent is:

1. An insulated container for liquefied gases comprising an inner metal shell, an outer metal shell surrounding said inner shell, spaced and heat insulated therefrom and with its bottom adapted to rest on the ground, in combination with a heating device located below said inner shell, heat insulated therefrom and which is so constructed and arranged that it is capable, without transferring any appreciable amount of heat to the inner shell and its contents, of so heating the ground immediately below the container as to prevent the same from freezing.

2. An insulated container for liquefied gases comprising an inner metal shell, an outer metal shell surrounding said inner shell, spaced therefrom and with its bottom adapted to rest on the ground, and heat insulating material between said shells, in combination with a heating device located below said inner shell, heat insulated therefrom and which is so constructed and arranged that it is capable, without transferring any appreciable amount of heat to the inner shell and its contents, of so heating the ground immediately below the container as to equalize the temperature thereof with relation to that of the adjacent ground around the container in order to prevent heaving of the ground below the container.

3. A structure according to claim 2, in which the heating device covers an area below the inner shell which is substantially coextensive with the ground area covered by the container.

4. A structure according to claim 2, in which the heating device is located between the bottoms of the inner and outer shells.

5. A structure according to claim 2 in which the heating device is disposed below the bottom of the outer shell.

6. A structure according to claim 2, in which the heating device is located below the bottom of the outer shell and a layer of insulating material is located below the heating device for limiting downward penetration of heat energy into the earth.

7. A structure according to claim 2, in which the heating device comprises a hollow grid-like member which extends throughout the area covered by the inner shell and is provided with an inlet and outlet for heating fluid.

8. A structure according to claim 2, in which the container and the heating device are substantially circular and of substantially the same diameter.

JAMES O. JACKSON.